United States Patent
Heminway et al.

(10) Patent No.: US 7,410,088 B2
(45) Date of Patent: Aug. 12, 2008

(54) SOLDER PREFORM FOR LOW HEAT STRESS LASER SOLDER ATTACHMENT

(75) Inventors: Trebor Heminway, Ashland, MA (US); Brian Massey, Marlborough, MA (US); Michael Powers, Amherst, NH (US); Russel S. Sossong, Shrewsbury, MA (US)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 475 days.

(21) Appl. No.: 10/656,392

(22) Filed: Sep. 5, 2003

(65) Prior Publication Data
US 2005/0051598 A1    Mar. 10, 2005

(51) Int. Cl.
*B23K 35/14*    (2006.01)

(52) U.S. Cl. .................................... 228/56.3; 228/246

(58) Field of Classification Search ................. 228/56.3, 228/245, 246
See application file for complete search history.

(56) References Cited

U.S. PATENT DOCUMENTS

| | | | |
|---|---|---|---|
| 4,008,948 A | 2/1977 | Dalgleish et al. | |
| 4,174,491 A | 11/1979 | Nakamura et al. | |
| RE30,348 E | 7/1980 | Hascoe | |
| 4,237,474 A | 12/1980 | Ladany | |
| 4,500,165 A | 2/1985 | Scholl et al. | |
| 4,663,652 A | 5/1987 | Nishizawa | |
| 4,702,547 A | 10/1987 | Enochs | |
| 4,741,796 A * | 5/1988 | Althaus et al. ........... | 156/272.4 |
| 4,778,241 A | 10/1988 | Haltenorth | |
| 4,779,778 A | 10/1988 | Rossberg | |
| 4,798,439 A | 1/1989 | Preston | |
| 4,807,956 A | 2/1989 | Tournereau et al. | |
| 4,818,056 A | 4/1989 | Enochs et al. | |
| 4,955,683 A * | 9/1990 | Shiga et al. ................... | 385/88 |
| 4,984,866 A * | 1/1991 | Boisgontier et al. ........... | 385/49 |
| 5,033,052 A | 7/1991 | Masuko et al. | |
| 5,077,878 A | 1/1992 | Armiento et al. | |
| 5,163,108 A | 11/1992 | Armiento et al. | |
| 5,227,646 A | 7/1993 | Shigeno | |
| 5,228,101 A | 7/1993 | Libby et al. | |
| 5,345,529 A | 9/1994 | Sizer, II et al. | |
| 5,412,748 A | 5/1995 | Furuyama | |
| 5,535,296 A | 7/1996 | Uchida | |

(Continued)

FOREIGN PATENT DOCUMENTS

EP    0346596 A2 * 12/1989

(Continued)

*Primary Examiner*—Kiley Stoner
(74) *Attorney, Agent, or Firm*—RatnerPrestia (57) ABSTRACT

A solder preform for attaching an optical fiber having a diameter to a fiber attach pad, the solder preform comprising a body including solder at least on a bottom surface thereof, the body having a groove extending along a first face from a first end to a second, the groove being larger in width than the diameter of the optical fiber to allow unimpeded alignment of the optical fiber. The solder preform above, wherein the body is formed substantially as a geometric shape, for example, a substantially rectangular box, a substantially cubical box, substantially a cylinder, substantially a semi-cylinder, substantially a sphere, substantially a semi-sphere, and substantially a cone or any geometric shape having a flat surface and a groove found therein.

8 Claims, 9 Drawing Sheets

U.S. PATENT DOCUMENTS

| | | | |
|---|---|---|---|
| 5,559,918 A | 9/1996 | Furuyama et al. | |
| 5,602,955 A | 2/1997 | Haake | |
| 5,619,609 A | 4/1997 | Pan et al. | |
| 5,745,624 A * | 4/1998 | Chan et al. | 385/91 |
| 5,768,456 A | 6/1998 | Knapp et al. | |
| 5,881,198 A | 3/1999 | Haake | |
| 5,896,481 A | 4/1999 | Baranek et al. | |
| 5,962,086 A * | 10/1999 | Offen | 428/4 |
| 5,966,488 A * | 10/1999 | Miura et al. | 385/93 |
| 6,006,639 A * | 12/1999 | Cherbettchian | 83/277 |
| 6,146,025 A | 11/2000 | Abbink et al. | |
| 6,164,837 A | 12/2000 | Haake et al. | |
| 6,207,950 B1 | 3/2001 | Verdiell | |
| 6,216,939 B1 * | 4/2001 | Thackara | 228/124.6 |
| 6,282,350 B1 | 8/2001 | Takahashi et al. | |
| 6,415,167 B1 | 7/2002 | Blank et al. | |
| 6,440,776 B1 | 8/2002 | Musk | |
| 6,443,171 B1 * | 9/2002 | Schneider et al. | 134/166 C |
| 6,614,605 B2 | 9/2003 | Auracher et al. | |
| 6,623,180 B2 | 9/2003 | Panicker et al. | |
| 6,652,158 B2 | 11/2003 | Bartur et al. | |
| 6,883,978 B2 * | 4/2005 | Powers | 385/92 |
| 2001/0010742 A1 | 8/2001 | Nakagawa et al. | |
| 2002/0110328 A1 | 8/2002 | Bischel et al. | |
| 2003/0210866 A1 | 11/2003 | Kuhara et al. | |
| 2003/0223709 A1 | 12/2003 | Lake et al. | |
| 2004/0124345 A1 | 7/2004 | Sell | |
| 2004/0223721 A1 | 11/2004 | Flanders et al. | |
| 2004/0264886 A1 * | 12/2004 | Powers | 385/92 |
| 2005/0013558 A1 * | 1/2005 | Powers | 385/92 |
| 2005/0051598 A1 * | 3/2005 | Heminway et al. | 228/56.3 |

FOREIGN PATENT DOCUMENTS

| | | | |
|---|---|---|---|
| JP | 01270012 A | * | 10/1989 |
| JP | 403095881 A | * | 4/1991 |

* cited by examiner

SOLDER PREFORM FOR LOW HEAT STRESS LASER SOLDER ATTACHMENT

TECHNICAL FIELD

The present invention relates generally to solder preforms and, more particularly, to solder preforms for fiber optical assemblies.

BACKGROUND OF THE INVENTION

The importance of achieving accurate mutual alignment of individual components in any optical system is well known. The miniature dimensions of components used in modern optical communication systems render such alignment difficult both to achieve and to maintain. For example, one problem in the construction of laser transmitters is that of efficiently coupling the optical output from a laser diode into an optical fiber. To obtain efficient coupling, the fiber end is desirably precisely aligned with the emitting area of the laser. When such alignment is achieved, the fiber is then fixed in place, ideally by a method that ensures alignment is sustained throughout the device lifetime.

Typically, a fiber is held in alignment with a laser using either epoxy, laser weld, or solder attachment techniques. Epoxy attachment is low cost but is not reliable over a long period of time due to outgassing and alignment shifts arising from aging and temperature cycling. Laser weld techniques are reliable but require costly ferrulization of the fiber and specially designed mounts or clips to allow weld attachment of the ferrulized fiber. Solder attachment techniques, on the other hand, are reliable and low cost, and thus have become prevalent in the art.

Currently, solder attachment may be attained through many techniques including: the application of a wire solder melted as it is fed into a desired location to secure a fiber; a sheet based preform that is placed either underneath, on top of, or surrounding the optical assembly prior to soldering; the application of molten solder directly at the point of attachment; and a blob preform with a fiber feedthrough through which a fiber is threaded prior to soldering.

The current methods of solder attachment undesirably impede motion of the optical fiber due to the weight of the preform placed over the fiber. Consequently, it may be more difficult to align and optimize a laser output signal to an optical fiber when both the fiber and the solder preform must be moved. Additionally, a desirable alignment of the fiber with the laser may be altered during soldering due to, for example, capillary stresses from the molten solder. These stresses may result in a misalignment of the fiber upon attachment even though the fiber was aligned before the solder was melted.

Even further problems may arise from the step of soldering a wire or preform to an optical fiber, which may include resistive heating, laser heating, or oven heating to melt the wire or preform. In this step, the optical fiber may be subjected to high power laser radiation and/or high temperatures needed to melt the solder, resulting in undesirable stresses due to thermal shock as well as possible alterations of optical properties of the optical fiber.

In the case of fiber feedthrough solder preforms, an extra manufacturing step may be required to feed an optical fiber through the solder perform, adding undesirable manufacturing costs.

SUMMARY OF THE INVENTION

The present invention is embodied in a solder preform for attaching an optical fiber having a diameter to a fiber attach pad, the solder preform comprising a body including solder at least on a bottom surface thereof, the body having a groove extending along a first face from a first end to a second, the groove being larger in size than the optical fiber to allow unimpeded alignment of the optical fiber.

In a further embodiment, the groove is greater in height than the diameter of the optical fiber, allowing a range of clearance above and below the optical fiber. Additionally, the groove may be greater in width than the diameter of the optical fiber, allowing a range of clearance on each side of the optical fiber.

In another embodiment, the solder preform may be formed as a geometric solid with at least one substantially flat face and may be, for example, a rectangular box, a cubical box, a cylinder, a semi-cylinder, a semi-sphere, a pyramid, and a cone.

Additionally, the solder preform may be formed from one of a metallic material and a glass material.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
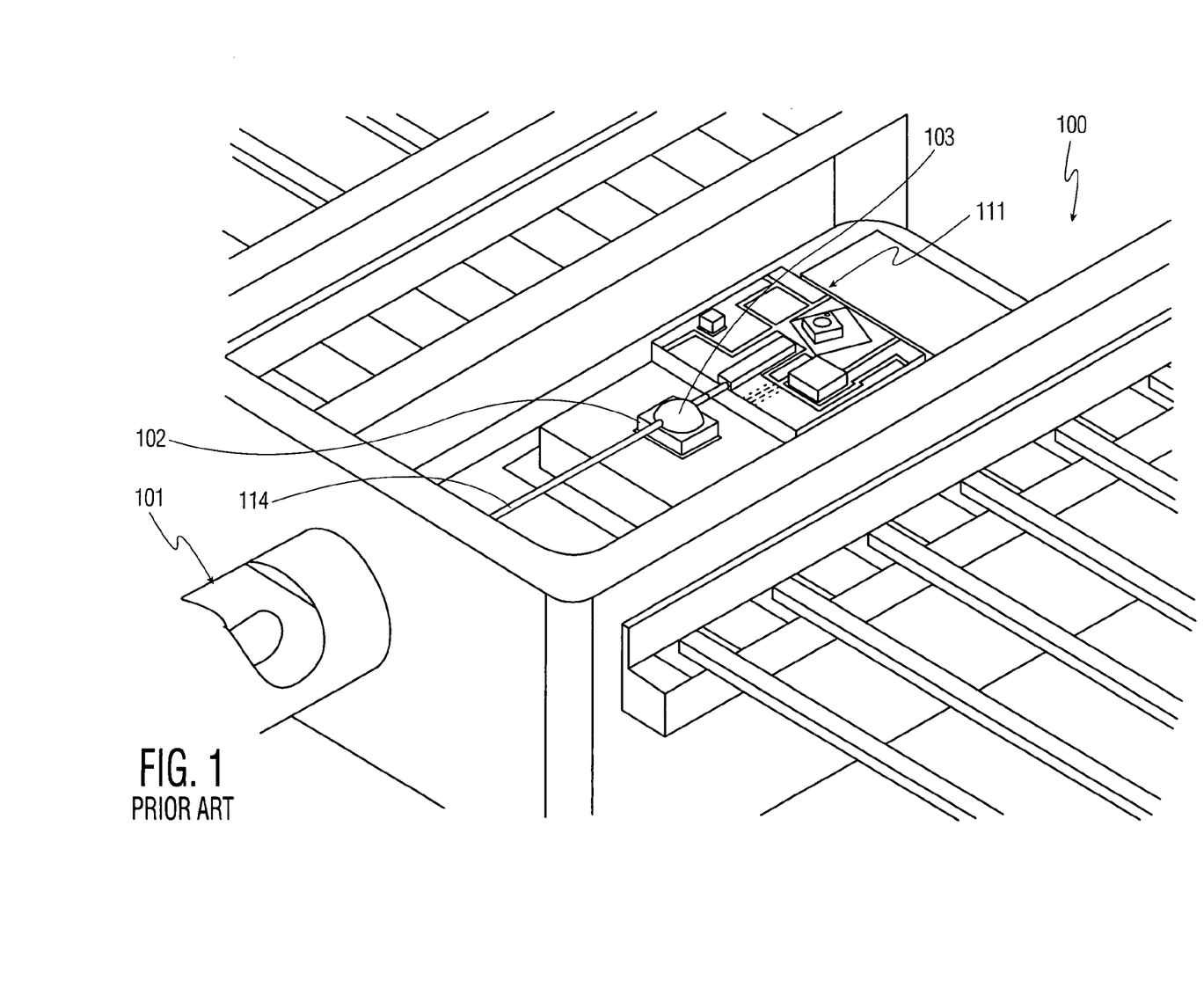
FIG. 1 is a laser package including a solder-attached optical fiber, according to the prior art.

Referring now to the drawings, in which like reference numbers refer to like elements throughout the various figures that comprise the drawing, FIG. 1 shows a fiber-coupled optical component package 100 according to the prior art.

The prior art package 100 includes optical fiber 114 inserted through snout feedthrough 101 and attached to fiber mount 102 with solder 103. Optical fiber 114 is also optically coupled to optical component 111 (e.g. semiconductor laser). In the prior art package 100, the fiber 114 is desirably aligned to the optical component 111, whereupon which solder 103 is applied to attach fiber 114 to mount 102. The application of solder 103 may introduce stresses on and around fiber 114 that may dislocate the desirable alignment of the fiber 114 to the optical component 111.

Figure 2A:
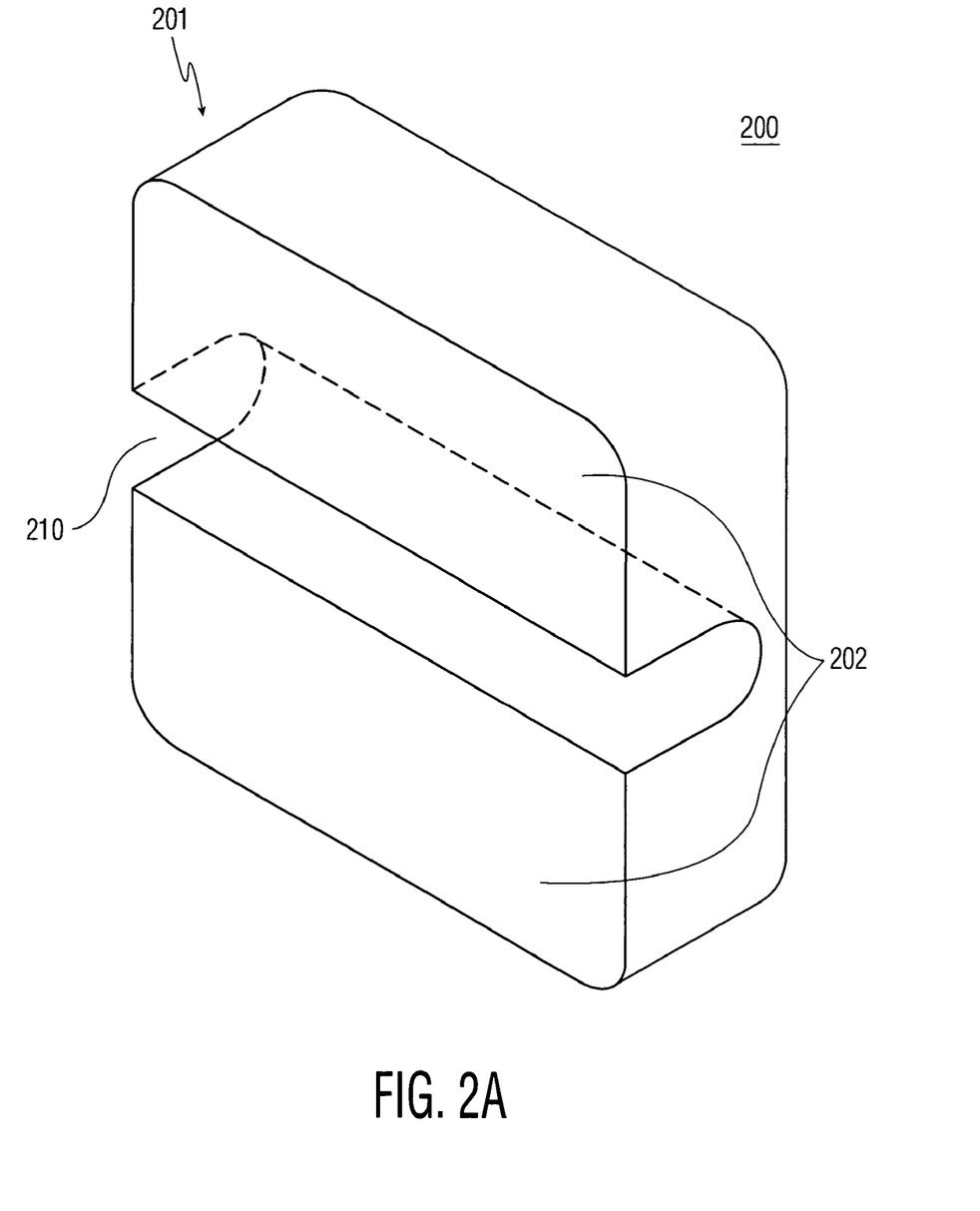
FIG. 2A is perspective drawing of a substantially rectangular solder preform according to the present invention.
Figure 2B:
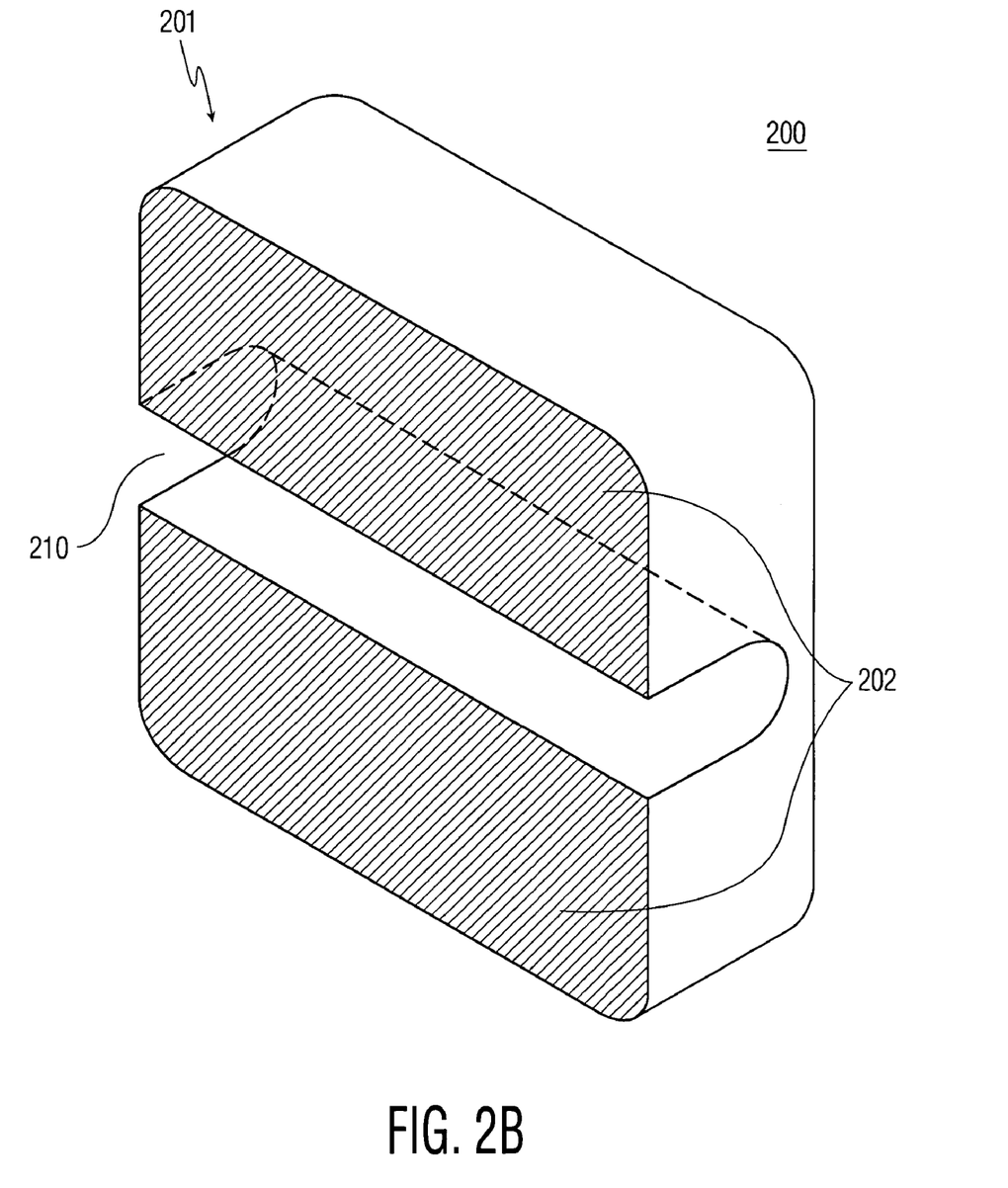
FIG. 2B is a perspective drawing of a substantially rectangular solder preform with solder on the bottom surface thereof, according to the present invention.

FIG. 2A shows an exemplary embodiment of the present invention as a substantially rectangular solder preform 200 having a body 201 with optical fiber groove 210 extending therein. The body 201 may be formed entirely of solder, or, alternately, may have at least a bottom surface 202 formed of solder, as illustrated in FIG. 2B. Further, groove 210 is configured so that an optical fiber (not shown in FIG. 2A or 2B) with solder preform 200 placed over a portion thereof may be aligned to an optical signal from an optical component (not shown in FIG. 2A or 2B) without contacting body 201 of preform 200.

FIGS. 3A-D further illustrate the exemplary embodiment of FIG. 2 from side, overhead, and front views, respectively. During manufacture, solder preform 200 with body 201 having a height H, groove height GH, width W, groove width GW, and length L may be stamped from a solder material such as a metal solder or a glass solder. The solder preform may further include a stamping radius 211 ranging from full flat to a radius of about 0.1 mm, in the present embodiment, desirably formed on the top-face corners of body 201, as well as a groove profile 212 ranging from full flat to full radius. The stamping radius 211 described above may facilitate easier removal of the preform from manufacturing die in a stamping process, enabling more efficient manufacture of the preform the subject invention contemplates use of any stamping radius that performs this function. Groove profile 212 described above is designed to meet the clearance requirements of an optical fiber to be used with the preform so as to allow desirable optical alignment of the optical fiber within the groove.

Figure 3A:
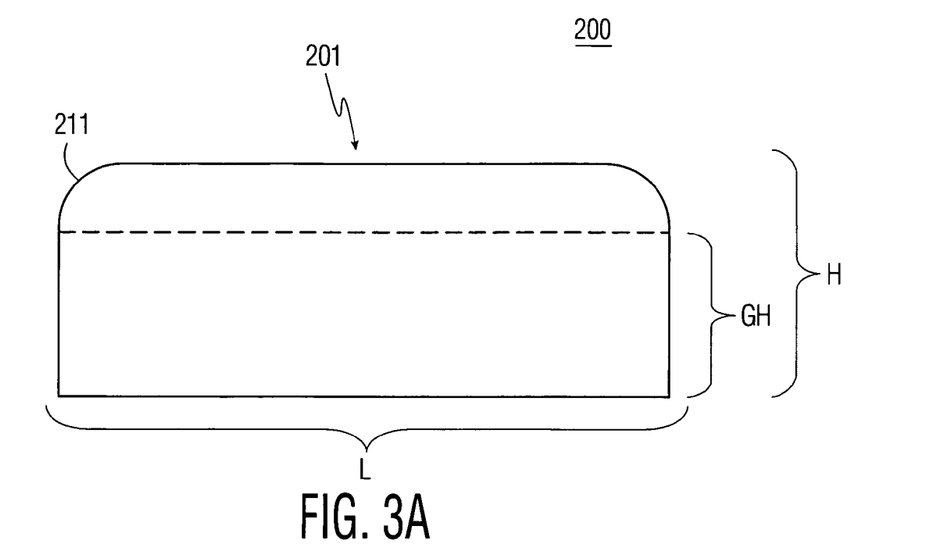
FIG. 3A is a side plan drawing of a substantially rectangular solder preform according to the present invention.
Figure 3B:
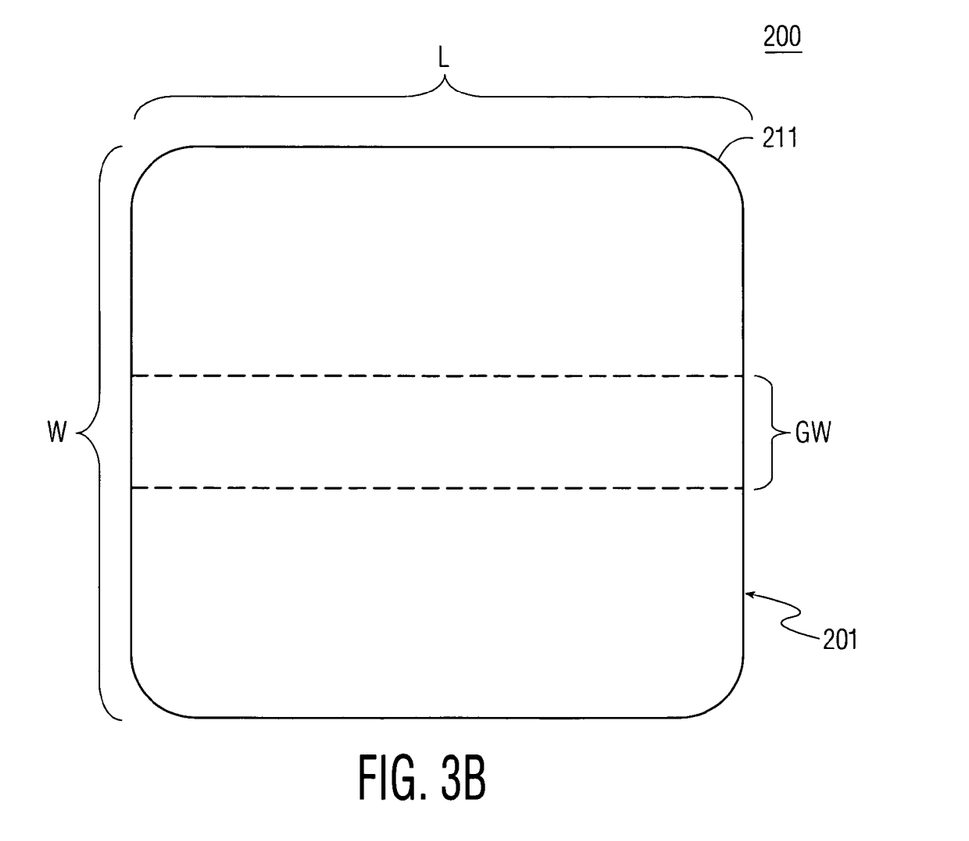
FIG. 3B is an overhead plan drawing of a substantially rectangular solder preform according to the present invention.
Figure 3C:
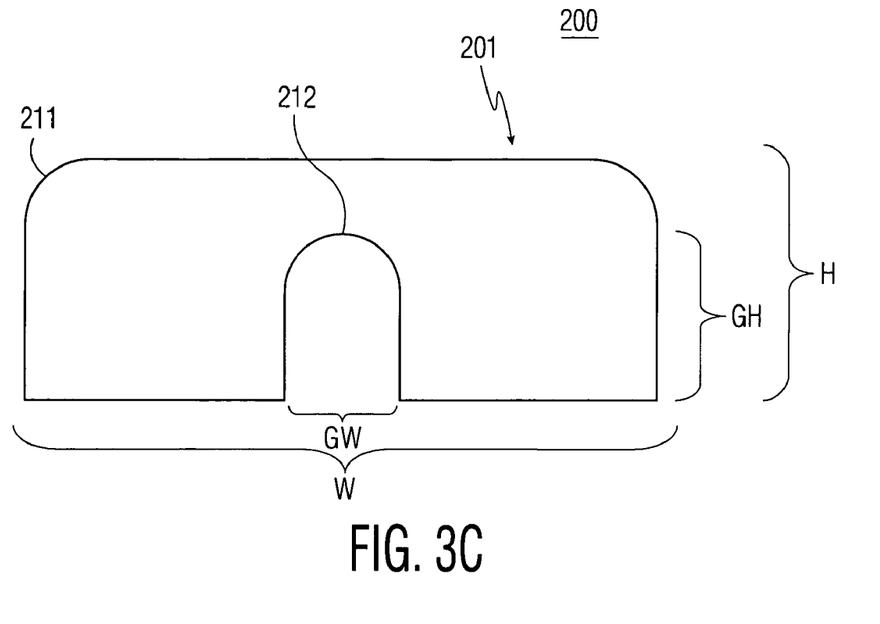
FIG. 3C is a front plan drawing of a substantially rectangular solder preform according to the present invention.
Figure 3D:
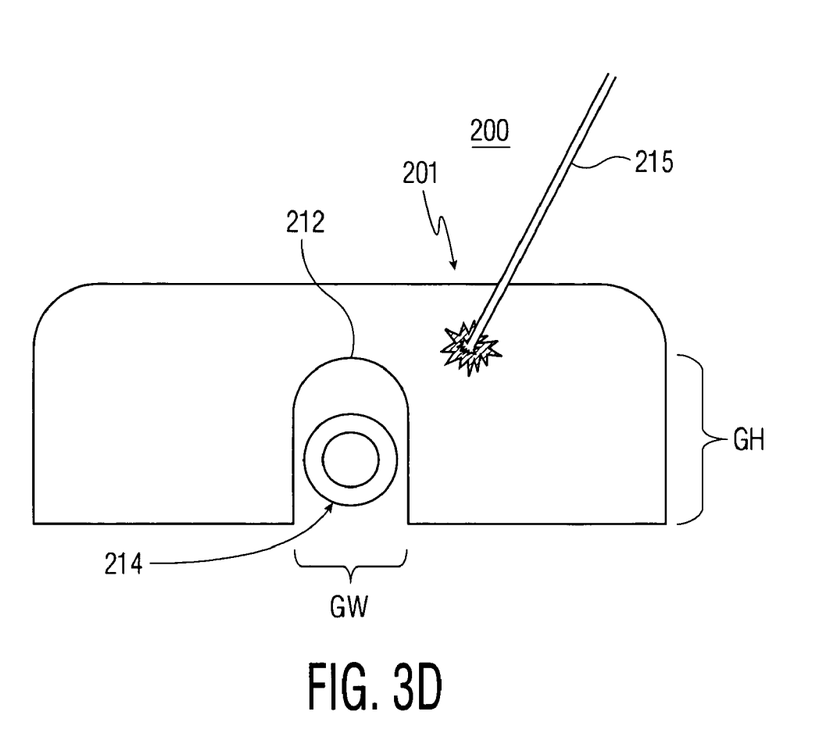
FIG. 3D is a front plan drawing of the preform in 3C with an optical fiber placed within the groove and laser radiation incident on the preform according to the present invention.

FIG. 3D shows an embodiment of the present invention wherein an optical fiber 214 is placed within the groove 212 of solder preform 200 having body 201. It can be seen that the groove height GH and groove width GW may allow for a range of clearance between the optical fiber 214 and body 201 of solder preform 200. This provides a range of movement wherein fiber 214 may be desirably aligned without touching or dragging on body 201 before laser radiation 215 is activated to melt solder preform 200. Once laser radiation 215 is activated, it is incident upon and melts solder preform 200, which shields optical fiber 214 from any incident laser radiation. The molten solder will then fill groove 212 around optical fiber 214. The range of clearance on either side of optical fiber 214 serves to desirably reduce the capillary forces associated with solder reflow around fiber 214. In the embodiment of FIG. 2B, where solder preform 200 includes solder only on bottom surface 202, laser radiation 215 may serve to heat body 201 of solder preform 200 such that the heat may transmit to bottom surface 202 and melt the solder material thereon, whereupon which the molten solder serves to desirably fill the groove 210 around optical fiber 214.

In one exemplary embodiment, the height H of the preform may be 0.38 mm+/−0.05 mm, groove height GH may range from 0.26 mm to 0.29 mm, width W may range from 0.5 mm to 1.5 mm, groove width GW may range from 0.15 mm to 0.23 mm, and length L may range from 0.5 mm to 1.5 mm. In the current embodiment, the solder preform described may be fitted over an optical fiber with diameter 125 μm, providing between 25 μm to 105 μm of total space between the optical fiber and the width of the groove, a bottom clearance of 25 μm to 100 μm underneath the optical fiber, and a top clearance of 35 μm to 140 μm above the optical fiber. The aforementioned spacing between the optical fiber and the solder preform are desirable so that the optical fiber may be optimally aligned and coupled to an optical signal of an optical component (e.g. semiconductor laser) with little or no dragging of the solid solder preform and minimal capillary forces from the molten solder preform.

Figure 4:
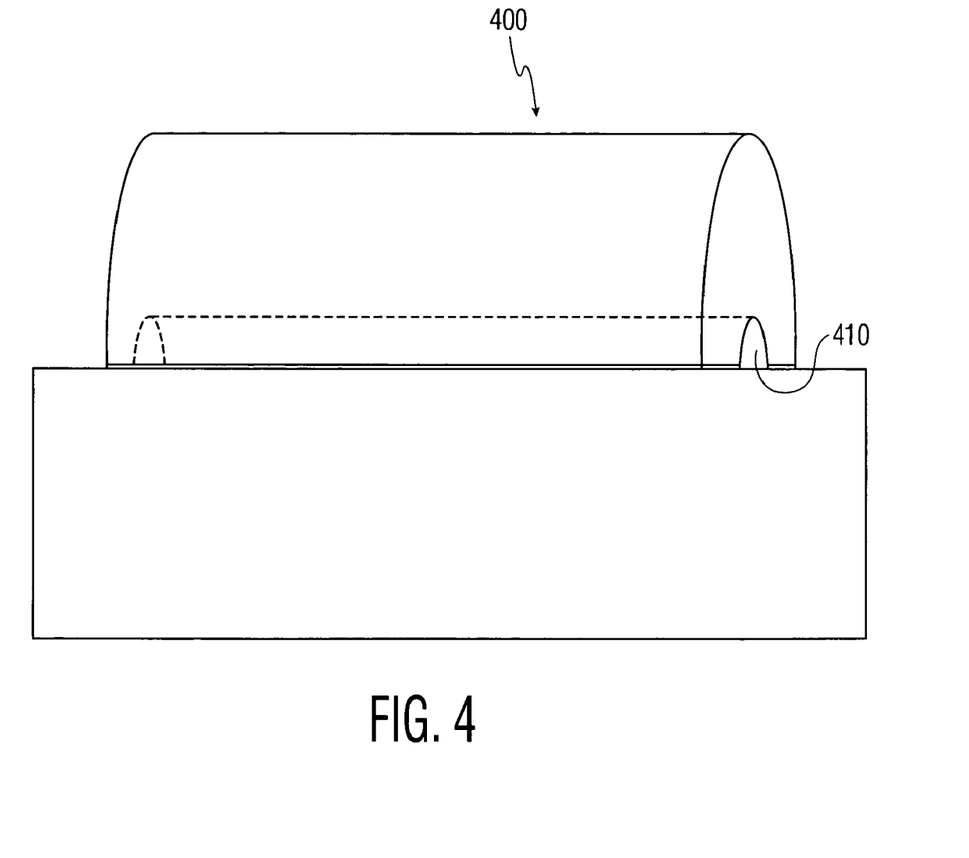
FIG. 4 is a perspective drawing of one embodiment of a substantially semi-cylindrical solder preform according to the present invention.

FIG. 4 shows a further embodiment of the present invention, wherein the solder preform 400 is formed substantially as a semi-cylinder with groove 410 extending therein.

Figure 5A:
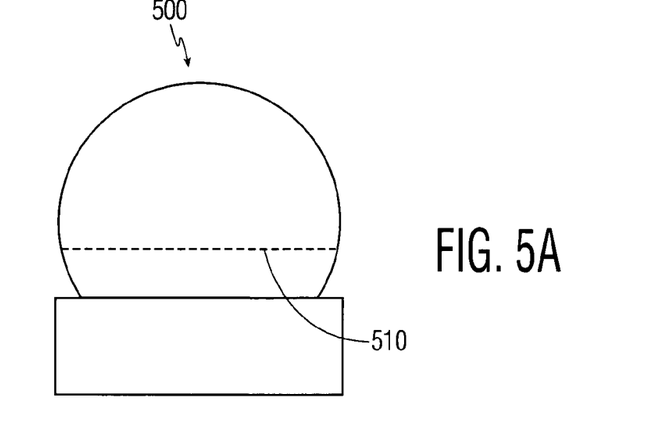
FIG. 5A is a side plan drawing of a substantially semi-spherical solder preform according to the present invention.
Figure 5B:
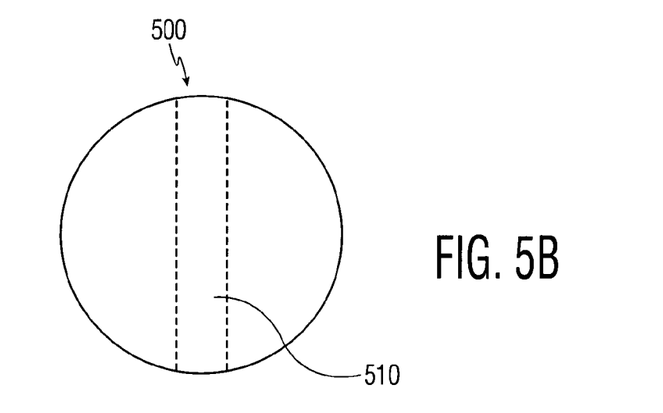
FIG. 5B is an overhead plan drawing of a substantially semi-spherical solder preform according to the present invention.
Figure 5C:
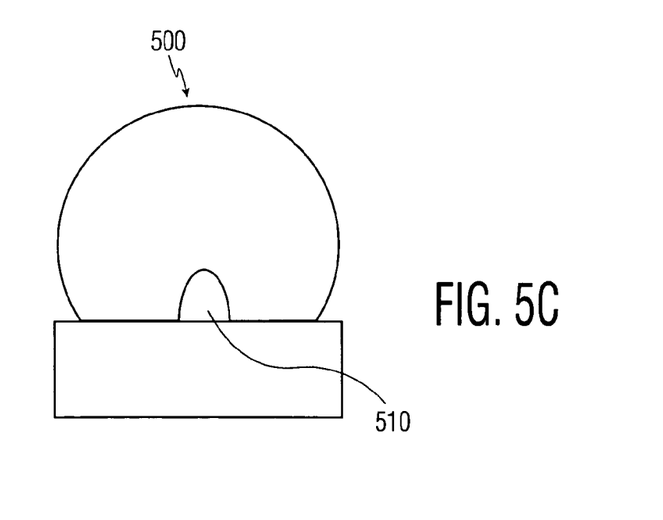
FIG. 5C is a face plan drawing of a substantially semi-spherical solder preform according to the present invention.

FIGS. 5A-C illustrate an alternate embodiment of the present invention from side, overhead, and face views, respectively. In the illustrated embodiment, the solder preform 500 is formed substantially as a semi-sphere with groove 510 extending therein.

It is understood by those skilled in the art that a solder preform according to the present invention may generally be formed in any geometric shape having at least one substantially flat surface wherein a groove is configured in the flat face to allow unimpeded passage and alignment of an optical fiber therein.

Figure 6:
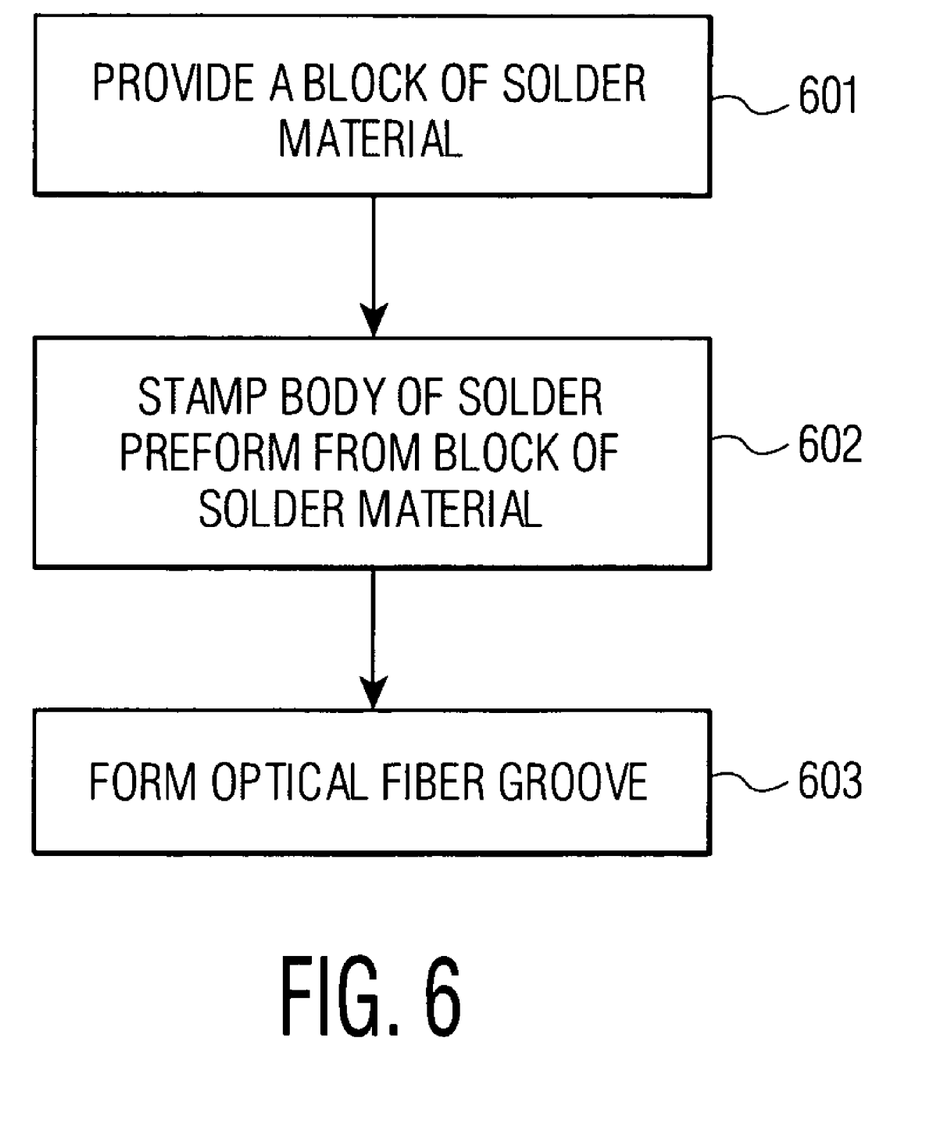
FIG. 6 is a flow chart outlining an exemplary manufacturing procedure according to the present invention.

FIG. 6 is a flow chart showing an exemplary method of manufacture of a preform according to the present invention. In the exemplary method, a first step 601 is taken to provide a block of solder material from one of a metallic material and a glass material. A next step 602 is taken to stamp a desired body shape from the block of solder material. The body shape may be formed, for example, as a substantially rectangular box, a substantially square box, substantially a sphere, substantially a semi-sphere, substantially a cylinder, substantially a semi-cylinder, and substantially a cone. A final step 603 is taken to form an optical fiber groove extending along a first face of the body shape from a first end to a second, the groove being larger in width than the diameter of an optical fiber to allow unimpeded alignment of the optical fiber. In one embodiment of the invention, step 603 may include grinding the optical fiber groove onto the stamped block of solder material or several stamped blocks aligned in an array. In another embodiment, step 603 may be eliminated, whereby the groove may be stamped into the block of solder material as part of step 602.

Figure 7:
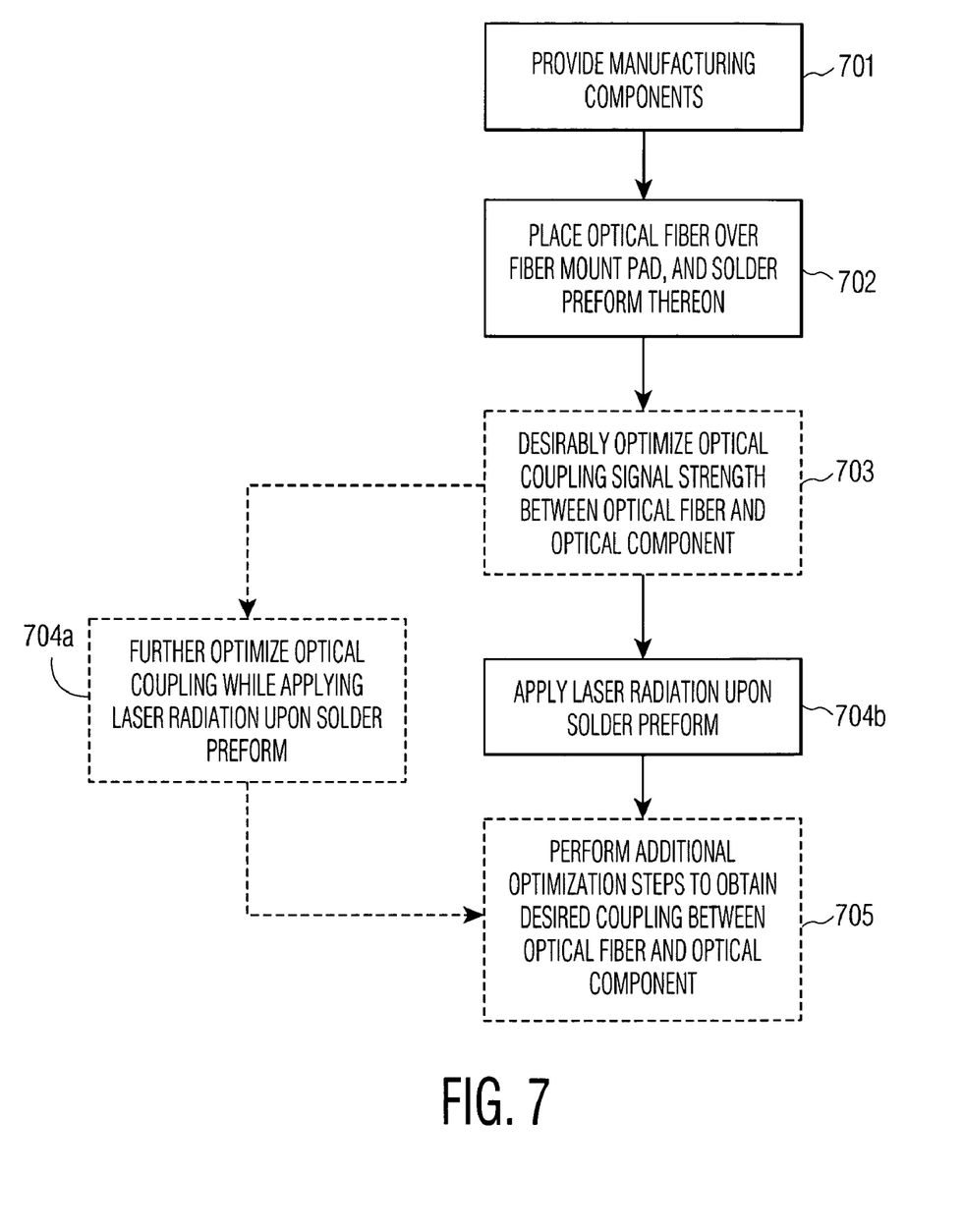
FIG. 7 is a flow chart outlining an exemplary method of use according to the present invention.

FIG. 7 is a flow chart showing an exemplary method of use of an embodiment of the present invention. A first step 701 provides all the necessary components of manufacture, which may include, for example, an optical fiber, an optical component and a fiber mount pad, and a solder preform according to the present invention. A next step 702 places the optical fiber over the fiber mount pad and the solder preform over the optical fiber and onto the fiber mount pad. It is assumed that a step (not shown in FIG. 7) was taken to roughly align the optical fiber to the optical component while placing the fiber over the fiber mount pad. It may also be desired to suspend the optical fiber over the fiber mount pad by a distance so that the fiber experiences minimal capillary forces from molten solder after step 704 is performed.

At step 703, high precision optimization steps are taken to desirably couple the optical fiber to the optical component. In one embodiment of the present invention, the optical component is a device for transmission of optical signals (e.g. a semiconductor laser), and is activated while the end of the optical fiber 214 closest to the optical component is moved. The other end of the optical fiber is monitored for desired output transmission. Alternately, it may be desired to couple the optical fiber to an optical component for reception of optical signals (e.g. a silicon photodiode, or even a further optical fiber). In this situation, an optical signal is generated at the end of the optical fiber 214 furthest to the optical component, while the other end is monitored for desired signal strength.

At this point, the process may continue to step 704a and optimize the desirable coupling of the optical fiber to the optical component while applying laser radiation to melt the solder preform. The laser radiation is applied to the solder preform in a location such that it does not impinge on the optical fiber, thereby minimizing radiation stresses to the optical fiber. Alternately, as in step 704b, the optimization may stop while the solder preform is melted with the laser radiation. At step 705, the desirable coupling between the optical fiber and optical component may be further optimized with additional optimization steps. Steps 703, 704a, and 705 are shown as being optional steps for optimizing the desirable coupling of the optical fiber and the optical component, one or more of which may be omitted in other exemplary embodiments of the method of use of the present invention.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed is:

1. A solder preform for attaching an optical fiber having a diameter to a fiber attach pad, the solder preform comprising a body including solder at least on a bottom surface thereof, the body having a groove extending along a first face from a first end to a second end, the groove being larger in size than the optical fiber to allow alignment of the optical fiber within the groove such that the solder preform is configured to permit alignment of the optical fiber in first and second directions when the groove of the solder preform is placed over the optical fiber, the body having a length defined as a distance between the first end and the second end, a height defined as a distance between the bottom surface and a top surface opposite the bottom surface, and a width defined as a distance between a third end and a fourth end opposite the third end, the groove having a height dimension relative to the height of the body and width dimension relative to the width of the body, wherein a ratio of said height dimension to said width dimension is about 1.1:1 to about 1.9:1.

2. A solder preform according to claim 1, wherein a height of the groove is larger than a diameter of the optical fiber, allowing a range of clearance above and below the optical fiber.

3. A solder preform according to claim 1, wherein a width of the groove is larger than a diameter of the optical fiber, allowing a range of clearance on at least a side of the optical fiber.

4. A solder preform according to claim 1, wherein the body is formed as a geometric solid with at least one substantially flat face.

5. A solder preform according to claim 4, wherein the geometric solid is selected from a group consisting of a rectangular box, a cubical box, a cylinder, a semi-cylinder, a semi-sphere, a pyramid, and a cone.

6. A solder preform according to claim 1, wherein the body is formed from a metallic material.

7. A solder preform according to claim 1, wherein the body is formed from a glass material.

8. A solder preform according to claim 1, wherein the body is formed into a substantially rectangular box having a height H of 0.38 mm+/−0.05 mm, a groove height GH in a range of 0.26 mm to 0.29 mm, a width W in a range of 0.5 mm to 1.5 mm, a groove width GW in a range of 0.15 mm to 0.23 mm, and a length L in a range of 0.5 mm to 1.5 mm.

* * * * *